United States Patent [19]

Lindström

[11] 4,296,627

[45] Oct. 27, 1981

[54] METHOD AND DEVICE FOR MEASURING THE REQUIRED COOLING CAPACITY OF A COLD SPACE AND THE REFRIGERATION CAPACITY OF THE REFRIGERATING MACHINERY

[75] Inventor: Yrjö V. Lindström, Helsinki, Finland

[73] Assignee: Alnor Oy, Finland

[21] Appl. No.: 107,767

[22] Filed: Dec. 28, 1979

[30] Foreign Application Priority Data

Jan. 4, 1979 [FI] Finland ............................. 790022

[51] Int. Cl.³ ............................................. G01K 17/00
[52] U.S. Cl. ..................................... 73/15 R; 62/127; 165/11 R
[58] Field of Search ................ 73/15 R, 15 A, 193 R, 73/193 A; 62/127; 165/11 R

[56] References Cited

U.S. PATENT DOCUMENTS

| | | | |
|---|---|---|---|
| 2,178,020 | 10/1939 | Kucher | 73/193 R |
| 4,172,555 | 10/1979 | Levine | 236/46 R |
| 4,200,910 | 4/1980 | Hall | 165/11 R |

*Primary Examiner*—James J. Gill

*Attorney, Agent, or Firm*—McGlew and Tuttle

[57] ABSTRACT

A method and device for measuring the required cooling capacity of a cold space is disclosed. The method includes the steps of cooling the cold space to a first low temperature below an ambient temperature, permitting the temperature of the space to rise to a second higher temperature below the ambient temperature during a first period, measuring the length of the first period, cooling the space again to the first low temperature during a second period, measuring the length of the second period, permitting the temperature to rise to a second higher temperature during a third period, heating the space during the third period by a known amount, and measuring the length of the third period to determine the thermal capacity of the space using the known amount of heating the measured first, second and third periods. The disclosed device includes a thermostat having a temperature sensor connected to the space for sensing the temperature, a refrigeration unit for cooling the space, a clock connected to the thermostat for measuring the period, and a heating means connected to the thermostat for heating the space during a third period.

5 Claims, 2 Drawing Figures

METHOD AND DEVICE FOR MEASURING THE REQUIRED COOLING CAPACITY OF A COLD SPACE AND THE REFRIGERATION CAPACITY OF THE REFRIGERATING MACHINERY

FIELD AND BACKGROUND OF THE INVENTION

The invention relates, in general, to refrigeration and, more particularly, to a new and useful method and device for measuring the required cooling capacity of a cold space.

Refrigerating machinery is used for a variety of purposes such as for storing of foodstuffs in industry, manufacture, trade, distribution and households, for air conditioning, in the medical science for tissue transplants, for storing of blood and blood plasma, in the chemical industry for process controlling and also for heating purposes in connection with heat pumps.

Because of the numerous areas of applicability, naturally, a multitude of apparatuses for achieving temperatures below the ambient temperature exist. The apparatuses are also characterized by a certain uniqueness, a typical example being the cold-storage rooms in connection with kitchens of row-style and single-family houses: hardly two identical self-made cold-storage rooms exist.

For the above reasons it is mostly necessary, when dimensioning the apparatuses to use approximate formulae and estimations, the accuracy of measurement of which is not especially good. Therefore the machinery is often over-dimensioned to be on the safe side, so that the refrigerating capacity will be sufficient.

In connection with factory-built products the refrigeration demand can usually be determined in the factory laboratory or in pilot cold rooms with the required accuracy. This applies especially to refrigerators, coolers and household freezers and to some extent also cold-storage rooms. In case of larger units which are either completely or partly built or assembled at their final location site the circumstances are somewhat different: the units are not necessarily assembled in the same way as under the supervised conditions in the factory, and especially the insulating of the constructions with their moisture proof vapour barriers, is often construction-wise and overly complicated procedure. Therefore the required cooling capacity normally is also greater than in a factory made unit of the same size.

Quite a different category of refrigeration units are used in connection with the building of cold spaces for cold storage units. These conventionally are built completely—except for the door—on their final location site, and wherefrom often a part of the insulation is left out, that is to give a sufficient room height; this method is commonly used i.a. in refrigerated domestic storage cellars, where the floor insulation is often completely omitted. Also, in supermarkets, the insulating floor elements in element built cold spaces are sometimes left out in order to level the interior floor with its surrounding. This is of importance when moving goods in carriers into and out from the cold storage room.

Because of the aforementioned, the required cooling capacities of many cold spaces as well as the refrigeration capacities of the refrigerating machinery therefor, are only approximately known.

SUMMARY OF THE INVENTION

The object of the present invention is to provides an apparatus and method for determining the refrigeration demand of a cold space by means of simple measurements and at the same time to show how also the cooling capacity of a refrigerating machinery for the cold space in question can easily be determined under actual operating conditions using the same principle.

Generally, an on-off control system is used for regulating the temperature of cold spaces, which means that the refrigerating machinery refrigerates the space to be cooled until the temperature in the space has decreased to the desired value. When this desired temperature has been reached, a temperature controlled switch, a thermostat, turns off the refrigerating machinery. The machinery being turned off, the temperature starts to rise in the space in question until the machinery is restarted at a second (higher) temperature. The temperature of the cold space thus varies in an interval between two predetermined temperature values, which interval usually is about 2° C. Thus, the temperature of a conventional cold storage room is usually +2° to +4° C.

The machinery being restarted the temperature of the cold space starts to fall. This is due to the fact that the cooling capacity of the refrigerating machinery is greater than the momentary required cooling capacity of the cold space. If the refrigeration capacity of the refrigerating machinery and the refrigeration demand of the cold space are of the same order, the temperature of the cold space naturally does not change but remains constant. Thus, the required cooling capacity of the cold space can be defined as that refrigeration capacity which is required to maintain a constant predetermined temperature in the cold space. When the temperature has reached the lower limit of the two-level regulation system, the machinery turns off. The refrigeration capacity thus falls to zero but because of temperature differences in relation to the surroundings, the refrigeration demand is greater than zero, and consequently the temperature of the cold space starts to rise again. The rate of the temperature change is proportional to the required cooling capacity, that is, to the flow of heat from the surroundings to the cold space. An increase in the load causes a faster temperature rise in the cold space, which means that the off-cycle of the machinery shortens.

BRIEF DESCRIPTION OF THE DRAWINGS

FIG. 1 shows schematically the temperature changes in a cold space as a function of the operating cycle of the machinery and of the time. At the point A, the temperature has reached the predetermined lower level, the machinery has stopped and the standing time starts. The temperature rise is presumed to be linear for reasons of simplicity. At the point B the temperature has reached its upper level and the machinery is put into operation as a result of which the temperature starts to drop. At the point C the temperature has again reached its lower level and the machinery stops, and at the point D the temperature has again reached its upper level.

The time difference between the points A and B is $T_1$, that between the points B and C is $T_0$ and that between the points C and D is $T_2$. The required cooling capacity of the cold space in the time interval A ... B is $Q_j$ and that in the time interval C ... D is $Q_j + \Delta Q_j$, and the refrigeration capacity of the refrigerating machinery in the time interval B ... C is $Q_k$.

Provided the difference between the upper and the lower temperature limits is small, the following equation can be written for the stages of the temperature increase:

$$Q_j \times T_1 = (Q_j + \Delta Q_j) \times T_2 \qquad (1)$$

because the amount of heat needed for raising the temperature from the lower limit to the upper limit is constant.

Equation (1) may be rewritten:

$$Q_j = [T_2/(T_1 - T_2)] \Delta Q_j \qquad (2)$$

If the external and internal load factors remain unchanged, $\Delta Q_1$ is naturally $=0$.

The method of measuring according to the invention is based on the fact that for the factor $\Delta Q_j$ is given a value which is different from zero and the magnitude of which is known, and the standing times $T_1$ and $T_2$ are measured, whereby the refrigeration demand $Q_j$ can be calculated from the equation (2). Once the refrigeration demand $Q_j$ has been determined, the refrigerating capacity $Q_k$ of the refrigerating machinery can be determined based on the fact that during the time interval $(T_1 + T_0)$ the amount of heat supplied to the cold space equals the amount of heat removed from the cold space by the machinery during the time interval $T_0$, when the refrigerating capacity is $Q_k$:

$$Q_k \times T_0 32 \; Q_j \times (T_1 + T_0) \qquad (3)$$

When the value for $Q_j$ from the equation (2) is introduced into the formula (3) one obtains $$Q_k = \frac{(T_1 + T_o) \times T_2}{(T_1 - T_2) \times T_o} \times \Delta Q_j \qquad (4)$$

The additional load $\Delta Q_j$ can be obtained for example with a calibrated resistance by feeding to the resistance a measurable electric current. Thus the refrigeration demand of the cold space and the refrigeration capacity of the machinery can be determined by measuring the lengths of the operating and standing cycles of the machinery without and with the additional load.

Figure 1:
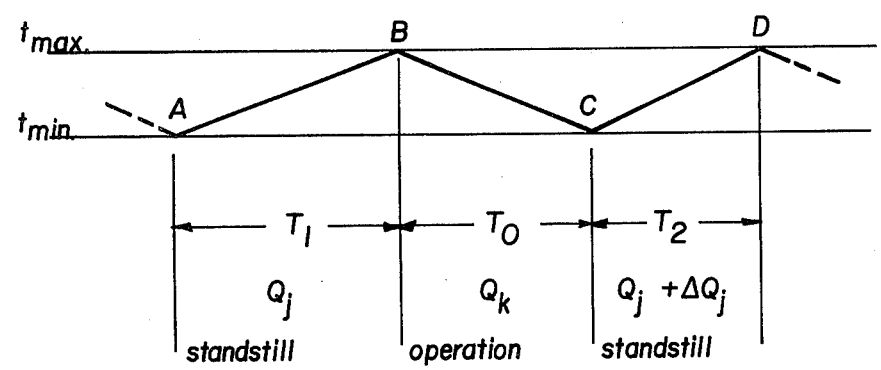
FIG. 1 is a schematic representation of the temperature changes in a cold space as a function of the operating cycle of the machinery and the time; and, FIG. 2 is a schematic representation of a novel arrangement for carrying out the inventive technique.
Figure 2:
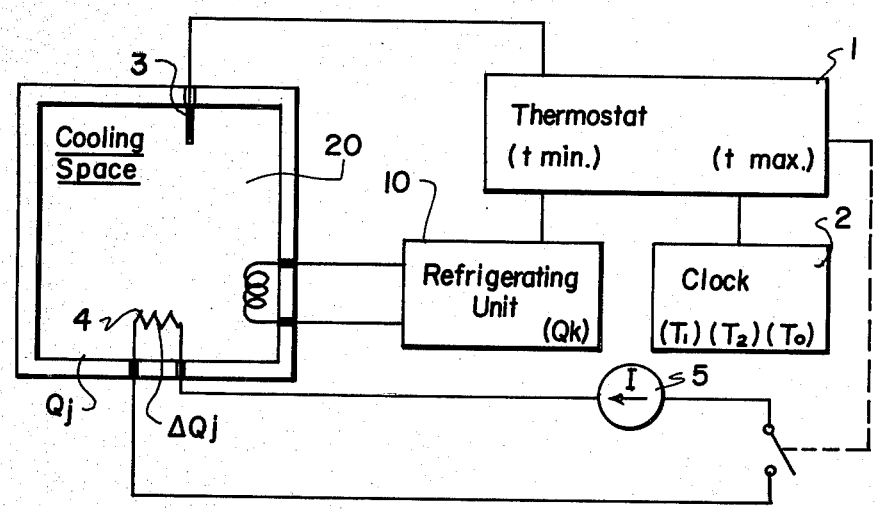

As schematically shown in FIG. 2, the device according to the invention comprises refrigerating machinery, designated by reference numeral 10, for refrigerating a space 20. The device for carrying out the method includes an accurate temperature controlled switch, (thermostat) 1 operatively connected to a time measuring device (clock) 2 which is put into operation and turned off by the thermostat. A temperature sensor 3 in the cold space 20 measures the temperature therein. The temperature sensor 3 is connected to the switch 1. The switch 1 energizes and de-energizes the refrigerating machinery 10 as a function of the signals received from temperature sensor 3. The clock 2 measures the time interval between the operational functions of the switch. In addition, a heating device 4, having a known heating capacity, is provided for supplying predetermined additional heat load to the space. The additional heat load ($\Delta Q_j$) is variable according to the refrigeration demand of the cold space through means of any known device 5 for varying the heat load of heating device 3.

The device according to the invention is suitable not only for determining the above mentioned refrigeration demand or the refrigeration capacity. It can also be used for carrying out the following measurements:
  to determine the heating demand of a space
  to determine the heating capacity of an apparatus
  to determine the insulation capacity of a construction.

The above listed are only examples of the numerous modes of application. An advantage with the device is its simplicity: in principle it is a measuring device for measuring the time required for crossing the temperature interval between two temperature limits, by means of which measuring device the varieties in the temperature changing time are measured when the change in the load is constant.

I claim:

1. A method of determining the cooling capacity of a container comprising, cooling contents of the container to a first low temperature below an ambient temperature, permitting the contents of the container to rise to a second higher temperature below the ambient temperature during a first period, measuring the length of the first period, cooling the contents of the space again to the first low temperature during a second period, permitting the temperature to rise to the second higher temperature during a third period, heating the contents of the container during the third period by a known amount, and measuring the length of the third period to determine the thermal capacity of the container using the known amount of heating and the measured first and third periods.

2. A method according to claim 1, wherein the cooling capacity is determined using the equation $$Q_j = [T_2/(T_1 - T_2)] \Delta Q_j;$$

where $Q_j =$ the cooling capacity of the container, $T_1$, $T_2 =$ said first and third periods respectively and $\Delta Q_j =$ said known amount of heating.

3. A method of determining the refrigeration capacity of a refrigeration machinery for cooling a container comprising, cooling contents of the container to a first low temperature below an ambient temperature, permitting the contents of the container to rise to a second higher temperature below the ambient temperature during a first period, measuring the length of the first period, cooling the contents of the space again to the first low temperature during a second period, measuring the length of the second period, permitting the temperature to rise to the second higher temperature during a third period, heating the contents of the container during the third period by a known amount, and measuring the length of the third period to determine the refrigeration capacity of the refrigeration machinery using the known amount of heating and the measured first, second and third periods.

4. A method according to claim 3, wherein the refrigeration capacity is measured using the equation $$Q_k = \frac{(T_1 + T_o) T_2}{(T_1 - T_2) T_o} \Delta Q_j;$$

where $Q_k =$ the amount of cooling of said second period, $T_1$, $T_0$, and $T_2 =$ said first, second and third periods respectively and $\Delta Q_j =$ said known amount of heating.

5. A device for determining the heat capacity of a container comprising, a thermostat having a temperature sensor connected to said container for sensing the temperature of contents of said container, refrigeration means responsive to said thermostat and connected to said thermostat and said container for cooling said container to a first low temperature below an ambient temperature, a clock connected to said thermostat for measuring a first period of time during which said refrigeration unit is deactivated and the temperature of contents of said container rise to a second higher temperature below ambient temperature and a second period of time during which said refrigeration unit is activated and the temperature of the contents of said container are cooled to said first low temperature, and a third period of time during which said refrigeration unit is deactivated again, and heating means connected to said thermostat and to said container for heating the contents of said container during said third period, said heating means comprising a resistor in said container and current means connected to said resistor and to said thermostat for supplying a known current to said resistor to produce a known heating and said current means being variable.

* * * * *